March 14, 1939.  G. A. TINNERMAN  2,150,852
METHOD OF MAKING FASTENING MEANS
Filed Oct. 4, 1937   2 Sheets-Sheet 1
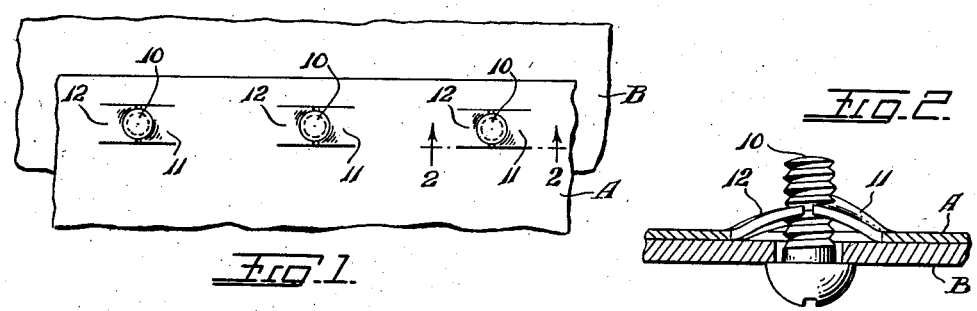
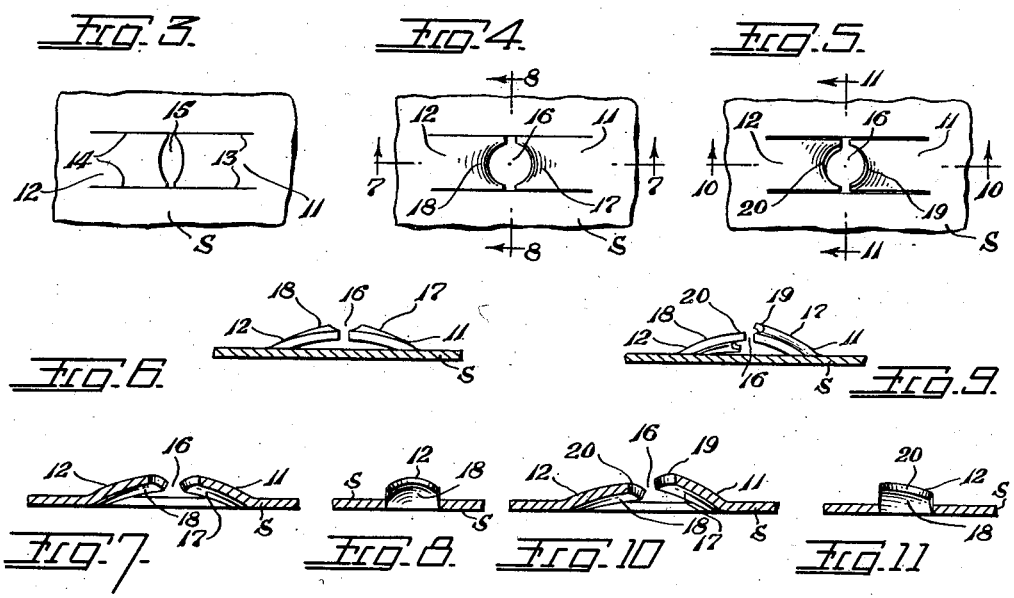
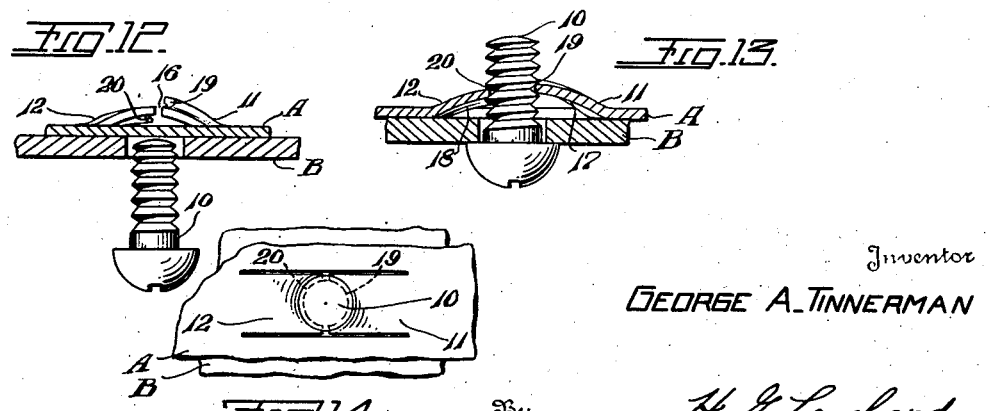
Inventor
GEORGE A. TINNERMAN
By H. G. Lombard,
ATTORNEY March 14, 1939. G. A. TINNERMAN 2,150,852
METHOD OF MAKING FASTENING MEANS
Filed Oct. 4, 1937 2 Sheets-Sheet 2
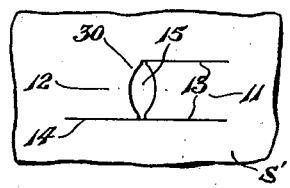
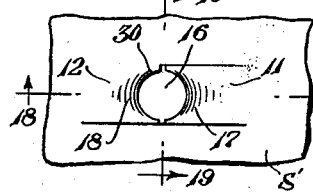
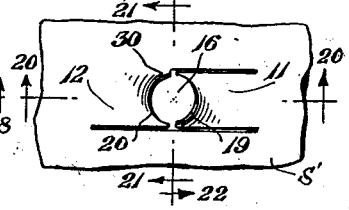
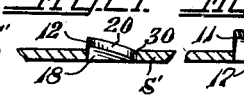
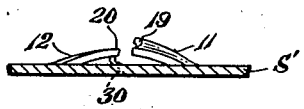
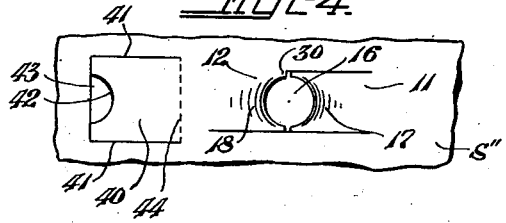
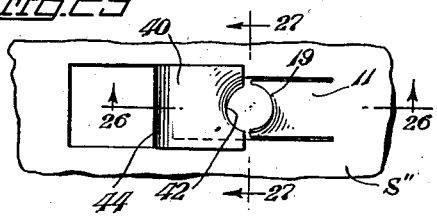
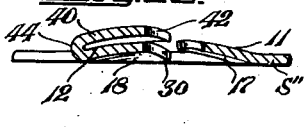
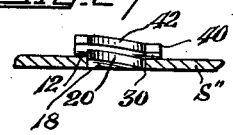
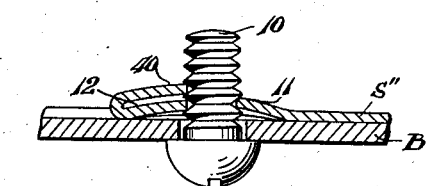
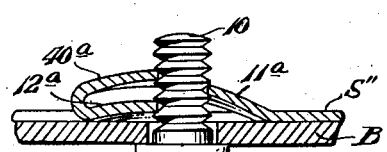
Inventor
GEORGE A. TINNERMAN
By H. G. Lombard
ATTORNEY Patented Mar. 14, 1939

2,150,852

UNITED STATES PATENT OFFICE 2,150,852

METHOD OF MAKING FASTENING MEANS

George A. Tinnerman, Rocky River, Ohio, assignor to Albert H. Tinnerman, Cleveland, Ohio Application October 4, 1937, Serial No. 167,310

14 Claims. (Cl. 29—148)

This invention relates to an improved method for working sheet metal parts such as panels, plates and various forms of connecting devices to adapt the same for receiving a threaded fastening member. An example of such a method for providing fastening means is disclosed in a copending application, Serial Number 133,202, filed March 26, 1937, of which the present application is a continuation in part, and which has since issued as Patent No. 2,096,387, October 19, 1937.

More particularly, this invention contemplates a method for providing a sheet metal part with an integral fastening means into which an ordinary bolt or screw fastening may be threaded and advanced to final applied position to be automatically held in locked fastening engagement against unscrewing, displacement or otherwise working loose incident to jarring, vibration and strain set up in the members secured.

The fabrication of sheet metal structures comprising parts secured by bolt or screw fastenings threaded in such parts has heretofore been found generally inefficient and unsatisfactory in that the sheet metal parts, being relatively thin, are of insufficient thickness to provide openings having walls of suitable area with which threads of a bolt or screw fastening may coengage to be retained effectively in applied position. In such sheet metal installations it is well known to be impracticable to tighten a threaded member in an opening thus provided, since the threads thereof are easily stripped by the axial drawing action incident to tightening, thereby causing the opening to become enlarged to the extent that the threaded member is loose in final applied position, subject to displacement and unscrewing, and otherwise results in a faulty, loose installation which is practically useless.

In certain methods, such as, for example, that disclosed in the copending application above referred to, fastening means may be provided in sheet metal structures by deforming elements out of the plane of the sheet to engage the threads of a threaded member at a point removed from the surrounding area to prevent the fastening elements from being pulled therethrough when the threaded member is drawn up.

In the aforesaid mentioned application, the method disclosed embodies, generally speaking, a number of steps by which the fastening means are provided by drawing and stretching an area of the sheet to provide a substantial wall of greater area than the space from which it is drawn, the enlarged wall thus obtained being provided with a suitable opening to receive a threaded member thereby presenting cooperating fastening elements which cannot pull through onto the reverse side of the sheet when a threaded member applied thereto is advanced to tightened, locked, fastening position.

The instant invention marks an improvement over this method in that the elements of the fastening means provided are suitably worked or deformed, simultaneously with a novel punching operation, to have a specific configuration providing a strengthened cross-section intermediate their lengths and with the bolt engaging extremities thereof so disposed as to adapt the same for uniform threaded engagement throughout with the threads of a threaded member applied thereto. Thus, due to their strengthened cross-section, the elements of the fastening means so provided, are capable of withstanding extraordinary strain and pressure in the application of the threaded member thereto, while the specific disposition of the bolt engaging extremities ensures that the same have uniform threaded engagement throughout with the threads of the threaded member in tensioned, locked engagement therewith in final applied fastening position.

The foregoing advantages of the fastening means provided by the method of the instant invention may be best appreciated when it is considered that in certain installations in which an unhardened sheet metal part such as a panel is secured, it is often necessary or desirable to employ a hardened screw-threaded member capable of cutting its own threads in a cooperating sheet metal part. Heretofore, it has been found that the use of hardened screws in such installations is both inefficient and impractical in that the metal of the sheet, being relatively soft and malleable, the areas immediately surrounding the opening receiving the screw give way easily when the inherently harder screw is drawn up to the extent that the elements comprising the screw thread engaging areas of the adjacent walls are mutilated and easily pull through onto the reverse side of the sheet thereby resulting in a loose, faulty fastening engagement.

In other installations it is often necessary to secure a member to a sheet metal part made of spring metal. In such constructions the spring metal material is harder than that of the screws in which instance the fastening means provided therein tend to cut away and strip the threads of the threaded member when advanced to applied fastening position. Inasmuch as fastening elements provided in spring metal by the method of the instant invention are so formed at their extremities as to engage the threads of a bolt uniformly throughout, there is little tendency for the threads of the threaded member to become mutilated, cut away or stripped as it is tightened to locked engagement with the fastening elements.

It is therefore a primary object of the present invention to provide a method of preparing unhardened sheet metal with a form of fastening means comprising elements so designed as to be especially adapted to withstand the extraordinary strain and drawing action of hardened screw-threaded members thereby eliminating the necessity for subjecting the sheet metal part to special treatment to harden the elements of the fastening means.

Another primary object contemplates a method for providing in hardened sheet metal such as spring steel, a fastening means comprising elements adapted to engage the threads of a threaded member uniformly throughout thereby minimizing stripping or mutilating of the threads thereof on being applied to tightened, fastening engagement.

Another object of the instant invention contemplates the provision in a sheet metal part, of fastening means comprising cooperating independently movable elements having wall areas of such cross-section as to provide for increased strength and rigidity throughout their lengths to withstand the axial drawing action of a threaded member applied thereto.

A further object of the invention comprehends a method by which fastening means are provided in sheet metal, in which the fastening elements thereof, at their extremities, correspond substantially to the cross-section of the threaded member and are suitably shaped to lie on a helix corresponding to the pitch of the threads of the threaded member for uniform threaded engagement therewith throughout.

A still further object is for an improved method of working sheet metal for receiving a threaded member comprising the provision of cooperating, independently movable elements of suitable design adapted for locking fastening engagement with a threaded member in applied fastening position without distorting or mutilating the fastening elements or the threads of the threaded member such that they may be disassociated and again employed in the same or a similar installation.

Further objects and advantages of the invention will be apparent to those skilled in the art as a description thereof proceeds with reference to the accompanying drawings in which like reference characters designate like parts throughout the same, and in which:

Fig. 1 is a top plan view of a sheet metal panel or like member having fastening means provided therein by the improved method of the instant invention and comprising cooperating fastening elements receiving threaded members in uniform threaded engagement therewith;

Fig. 2 is a section along line 2—2 of Fig. 1, looking in the direction of the arrows, showing in detail the fastening elements, provided by the improved method, in uniform threaded engagement with a threaded member throughout in applied fastening position;

Figs. 3, 4, and 5 illustrate in plan the improved method of providing fastening means as embodied in a series of steps, Fig. 3 showing the initial step of slitting and punching an opening of specific configuration in the sheet metal part to define the fastening elements;

Fig. 4 shows the step in the method by which the fastening elements so defined, are worked longitudinally as to have a cross-section providing increased strength therein and with the extremities thereof so disposed as to present an opening corresponding substantially to the cross-section of the threaded member;

Fig. 5 illustrates the final step in the method by which the extremities of the fastening elements are suitably shaped and trued to lie on a helix corresponding to the threads of the threaded member for uniform threaded engagement therewith throughout;

Figs. 6, 7, and 8 are various views of the step in the method represented in Fig. 4, Fig. 6 being an edge elevation, Fig. 7 being a section taken on line 7—7, and Fig. 8 being a section taken along line 8—8, respectively, looking in the direction of the arrows;

Figs. 9, 10, and 11 are various views of the step illustrated in Fig. 5, Fig. 9 being an edge elevation, Fig. 10 being a section on line 10—10, and Fig. 11 being a section on line 11—11 respectively, looking in the direction of the arrows;

Fig. 12 shows in edge elevation the elements of a completed fastening means with a threaded member about to be applied thereto in an installation;

Fig. 13 shows a threaded member as applied to locked fastening engagement in an installation comprising fastening elements provided by the method of the instant invention; and, Fig. 14 is a top plan view of an installation such as represented in Fig. 13 showing the elements of the fastening means provided by the improved method as disposed in uniform threaded engagement throughout with the threads of a bolt applied to locked fastening position.

Figs. 15 to 23 inclusive show a further embodiment of the improved method for providing a modified form of fastening means, Fig. 15 representing in plan the initial step of slitting and punching an opening of specific configuration in the sheet metal part thereby defining the fastening elements to be formed therefrom;

Fig. 16 shows in plan the step in the method by which the fastening elements so designed are worked longitudinally to have a cross-section providing increased strength therein and with the extremities thereof so disposed as to present an opening corresponding substantially to the cross-section of the threaded member to be applied thereto;

Fig. 17 illustrates in plan the final step of this embodiment by which the extremities of the fastening elements are suitably shaped and trued to lie on a helix corresponding to the threads of the threaded member to have uniform threaded engagement therewith throughout:

Figs. 18 and 19 are various views of the step represented in Fig. 16 of this embodiment of the method, Fig. 18 being a section on line 18—18, and Fig. 19 being a section on line 19—19 respectively, looking in the direction of the arrows;

Figs. 20, 21 and 22 are various views of the step of the method illustrated in Fig. 17, Fig. 20 being a section on line 20—20 thereof, Fig. 21 being a section on line 21—21, and Fig. 22 being a section on line 22—22 respectively, looking in the direction of the arrows; and, Fig. 23 shows in edge elevation, the elements of the fastening means as completed in the step represented in Fig. 17, and Figs. 20 to 22 inclusive.

Figs. 24 to 29 inclusive show another embodiment of the improved method in which the fastening means comprises an additional fastening element making for greater strength in an installation, Fig. 24 representing in plan the initial step of slitting and punching an area of a sheet metal part to define the respective fastening elements;

Fig. 25 illustrates in plan the completed fastening means as provided in this embodiment of the improved method;

Figs. 26 and 27 are various views of the completed fastening means illustrated in Fig. 25, Fig. 26 being a section taken along line 26—26, and Fig. 27 being a section taken on line 27—27, respectively, looking in the direction of the arrows;

Fig. 28 shows a threaded member as applied to locked fastening engagement in an installation comprising fastening elements provided in this embodiment of the improved method, the fastening elements being so designed as to engage two distinct threads of the threaded member; and, Fig. 29 shows a threaded member as applied to locked fastening engagement in an installation comprising fastening elements provided by this embodiment of the improved method, the fastening elements being so designed as to engage three distinct threads of the threaded member.

Fastening means provided in sheet metal in accordance with the method of the present invention comprise, generally, cooperating fastening elements so formed as to coact with the thread of a threaded member applied thereto under tension and with progressively increasing binding action as the member is drawn up. This binding action becomes most pronounced and positive when the threaded member is driven home to tightened fastening position to the extent that the fastening elements snugly engage the thread throughout and dig into and become embedded in the root of the threaded member thereby providing a locked fastening engagement from which the threaded member cannot work loose under extraordinary conditions of wear, vibration and strain and over long periods of use.

It has been found in the art of securing sheet metal parts by bolts and screws, the mere provision of an opening in a sheet metal part to receive a threaded member is not effective to provide a fastening means in which a threaded member may be applied and drawn up as necessary to provide a tight, rigid installation. However, as by the method of this invention, if such an opening is provided in conjunction with distinct elements which are struck and formed to project materially out of the plane of the sheet, such projecting elements serve to bolster the thread engaging extremities thereof and thus prevent the same from being pulled through onto the reverse side of the metal sheet when a threaded securing member is applied thereto and drawn taut.

In several prior patents applicant has disclosed various methods and arrangements for obtaining such fastening means, but in each instance it is to be noted that the elements comprising the fastening means are substantially flat or arched intermediate their lengths, and, at their extremities present a substantially diamond shaped opening. Thus, the extremities of the fastening elements in presenting a substantial diamond opening, do not engage the thread of a threaded member throughout but only at spaced points; this arrangement together with the fact that the fastening elements intermediate their lengths are flat or arched and thereby readily yieldable, makes for a fastening means to which a threaded member may be quickly applied to home position in a direct axial thrust or substantial rachet-like action and then rotated a quarter turn or more to tighten and lock in such home position. Such fastening means for quickly assembling and securing sheet metal parts are highly advantageous for speed and economy in present day mass production and accordingly have been readily accepted by the trade and now have a wide range of use. However, it has been found that in working in relatively thick sheet metal parts, for example, such forms of fastening means are not capable of the added strength required and accordingly it has been found necessary to sacrifice some of the aforesaid speed possible in assembling operations, but compensate therefor by providing fastening elements which are not as yieldable but which are inherently stronger and capable of withstanding any ordinary reasonable requirement which heretofore has necessitated the use of individual nuts, bolts and lock washers and the tedious, time consuming operations necessary in the application thereof in an installation.

Generally speaking, the added strength obtained in fastening elements provided in sheet metal by the instant method is the result of several entirely new teachings; thus, the fastening elements are each formed with a substantial corrugation throughout their lengths providing increased strength therein; the extremities of the fastening elements present an opening complementary to the cross-section of the threaded member for substantial line contact with the root diameter thereof at points substantially at right angles to its longitudinal axis; and the trued disposition of the extremities of the fastening elements to lie on a helix corresponding to that of the threads of the threaded member provide for uniform threaded engagement therewith throughout. Accordingly, by the method of the present invention integral fastening means may be effectively provided in relatively heavy sheet metal parts of any size in an installation such as represented in Figs. 1 and 2 in which, for example, a panel member A provided with a series of bolt receiving means each comprising cooperating fastening elements 11, 12, may be secured as by bolts 10 passing through apertures in a supporting member B.

Referring more particularly to Figs. 3 to 11 inclusive of the drawings, S designates a sheet metal part which may be a fragment of any sheet metal structure in which it is desired to provide fastening means to secure such part by means of a threaded member such as a common screw, bolt, sheet metal screw or hardened tapping screw. In the instant method for providing fastening means in the sheet metal part, a suitable area of the sheet S, Fig. 3, is worked as by punching an irregular, substantially egg-shaped opening 15 together with suitable slits 13, 14, thereby defining distinct, independent elements 11, 12; thus the extremities of the fastening elements or the walls of the opening thus provided are initially, substantially elliptical in form and the opening itself is of a size substantially smaller than the minimum cross-sectional area of the threaded member to be applied thereto. The punched and slit area thus provided defining the fastening elements is then subjected to a forming operation by a suitable forming die acting more particularly upon the independent fastening elements throughout their lengths to press the same out of the plane of the sheet metal part into substantial elongated corrugations 17, 18, Figs. 4 and 6 to 8 inclusive. This forming operation disposes the fastening elements 11, 12 in substantially oppositely disposed relation projecting out of the plane of the sheet with each of said elements having a cross-section substantially in the form of a corrugation as shown at 18, Fig. 8. At the same time, by virtue of this corrugating operation of the fastening elements 11, 12, the extremities thereof are distorted from their substantially elliptical, egg-shaped configuration 15, Fig. 3, into a circular opening 16 in plan, Fig. 4, corresponding in size substantially to the area of the threaded member at its root diameter. It will therefore be understood that by this forming operation, the opening is not only enlarged to correspond to the minimum cross-sectional area of the threaded member to be applied thereto, but also provides corrugations extending substantially throughout the lengths of the fastening elements and disposes the same in materially projecting relation above the plane of the surrounding area of sheet metal from which they have been deformed. Thus the fastening elements by reason of the corrugations provided therein, are made inherently stronger and by reason of their projecting relation above the plane of the sheet are so disposed at their extremities as to engage a threaded member applied thereto on lines substantially as at right angles to the longitudinal axis thereof such that in the operation of tightening the threaded member, the extremities of the fastening elements will more naturally tend to dig into the grooves intermediate the threads and root diameter thereof at a point removed from the plane of the sheet, thereby minimizing and practically defeating any possibility of the same pulling through onto the reverse side of the sheet.

The final step in the method is disclosed in Figs. 5 to 11 inclusive; and this step may involve a separate operation or be incorporated in the step described with reference to Figs. 4 and 6 to 8 inclusive. In this step, the oppositely disposed elements 11, 12 now corrugated as at 17, 18, Figs. 6 to 8 inclusive, are subjected to a suitable operation by which the extremities of said elements are moved from their substantially oppositely disposed relation, Fig. 6, and shaped and trued to lie on a helix corresponding to that of the threaded member to be applied thereto substantially as shown in Figs. 9 and 12. In this operation the configuration of the truly circular opening 16, shown in plan in Fig. 5 is not disturbed but rather, only the extremities of the fastening elements are shaped to lie at definite points projecting out of the plane of the sheet S; thus the wall portion or extremity 20 of fastening element 12 lies on a helix but even at its lowest point is definitely above the plane of the sheet and in such relation as to readily receive the leading thread of the threaded member introduced thereto and thereafter coact with the opposed element 11, the extremity 19 of which comprises the highest points of the helix. Since said extremities 19, 20 of the fastening elements 11, 12 as stated, present a substantially truly circular opening 16, and are also disposed on a helix corresponding to the threads of the threaded member, they naturally are adapted to engage the bolt throughout and in uniform threaded engagement with any thread thereof at all points. Thus the maximum binding action of the extremities of the fastening elements with the thread of the bolt is ensured thereby providing, in this respect, unusual holding ability and strength in the fastening means. Upon continued rotation of a threaded member, this uniform threaded engagement of the extremities of the fastening elements with the threads thereof becomes pronounced and positive in a tightened installation to the extent that the extremities tend to dig into the grooves intermediae adjacent threads and become embedded in the root diameter of the threaded member in locked fastening engagement therewith.

The unusual strength and holding ability of fastening means provided in sheet metal by the instant method may be better understood from a consideration of Figs. 12 to 14 inclusive showing a sheet metal part A provided with fastening means 11, 12 and which is to be secured to a supporting part B by a threaded member 10 shown about to be applied thereto. Inasmuch as the lowest point of that portion of the helix defined by the extremity 20 is directly in line with the leading thread of the threaded member, the bolt may be quickly applied thereto and readily advanced axially by the usual turning action. As the leading thread of the bolt 10 is rotated the same contacts the remaining portion of the helix defined by the extremity 19, such that in any position the said extremities 19, 20 are in uniform threaded engagement throughout with the thread of the bolt substantially as shown in Figs. 13 and 14. Further rotation of the bolt causes the fastening elements 11, 12 to become tensioned and of course have a tendency to move toward the plane of the sheet, but due to the corrugated cross-section thereof, the fastening elements are possessed of unusual inherent strength and thus tend more effectively to move toward each other and dig into the groove intermediate the adjacent threads and also embed into the root diameter of the threaded member in locked frictional, fastening engagement therewith. Thus such further rotation of the screw may be said to cause a tensioning action and progressively increasing frictional engagement between the extremities of the fastening elements and the root diameter of the bolt until the engagement thereof is such that the sheet metal element is rigidly secured and any vibration, jarring, or strain in the structure cannot cause displacement, reverse rotation or tend toward unscrewing of the bolt from applied position.

It will therefore be seen that in the instant method the fastening means provided require no special treatment other than forming and shaping. The elements may be provided in unhardened relatively thick sheet metal parts such as panels and the like, individually or in mutiple, to afford a most efficient securing arrangement making for extreme economy in the fabrication thereof, especially in mass production. The fastening means as provided by the method of the instant invention may be just as well prepared for even greater holding ability in tempered or other specially treated metal such as spring steel. In any arrangement, it will be understood that the fastening means, above described, may be incorporated in any sheet metal structure and enables the attachment of parts to said structure by means of threaded members which are directly threaded into the fastening means without the use of nuts or lock washers, and without possibility or likelihood of stripping the threads of the bolt or pulling the fastening elements through onto the reverse side of the sheet. Still further rigidity and locking action in an installation may be obtained by the use of a threaded member such as a sheet metal screw having a deep thread and a pitch greater than the thickness of the fastening elements. And, if desired, the sheet metal part in which the fastening means are provided may be in the form of a disc or plate usable in the manner of a nut and in this respect the plate would have a function analogous to that of a self-locking nut. Also in any arrangement, due to the fact that the specific fastening means provided comprise distinct independently movable members, each fastening element is capable of automatically setting in locked fastening engagement with the cooperating portion of the thread of the threaded member without becoming mutilated or permanently distorted to the extent that it may not again be effectively employed. Thus, the fastening elements provided as by the instant method are advantageous over any heretofore known form of similar fastening means in that they may be applied in an installation and, if desired, readily disassociated from the cooperating threaded member and again employed in the same or similar installation.

Figs. 15-23 inclusive show the method of the present invention as developed in another embodiment by which further added strength may be obtained in the fastening means provided. The method as followed with respect to this embodiment is substantially identical to that disclosed with reference to Figs. 1-14 inclusive except in the initial step of punching the opening 15 and slitting to define the distinct, independent fastening elements. In this form of the invention the lower fastening element 12, Fig. 15 is provided as by a single slit 14, such that at one edge the element is integral in the plane of the sheet S' as at 30. Otherwise, the method is carried out in this embodiment substantially as described above with reference to Figs. 1-14 inclusive making due provision, of course, in the design of the forming die for the area 30 in which the element 12 is integral. Thus, in the next succeeding step illustrated in Fig. 16, the element 11, 12 are corrugated throughout their lengths as at 18, Fig. 19 providing increased strength therein and at the same time causing the opening 15, Fig. 15, presented by the extremities 19, 20, of the fastening elements to be enlarged to a truly circular configuration as at 16, Fig. 16, the element 12 however, remaining integral in the plane of the sheet S', as shown at 30, Fig. 18. In the final step in which the extremities 19, 20, of the elements 11, 12 are shaped and trued to lie on a helix corresponding to that of the threads of the threaded member substantially as illustrated in Fig. 17, the truing of the element 12 necessarily begins at the plane of the sheet since this element is integral therewith at such point. This may be seen in Figs. 20 and 21 wherein element 12, comprising portion 20 of the helix, being integral with the sheet, rises gradually out of the plane of the sheet to a point in line with the remaining portion 19 of the helix constituting the extremity of the cooperating fastening element 11, Fig. 22. Accordingly, the completed fastening means presented in this embodiment of the method of the invention appears substantially as shown in Fig. 23 wherein the lowermost portion of the helix lies directly in the plane of the sheet. It may therefore be appreciated that in providing this form of fastening means there are several most important advantages. Thus, the lowermost portion of the helix being directly in the plane of the sheet, the leading thread of the threaded member is most easily engaged therewith in a rapid, quick turning movement thereby providing for greater speed in assembling operations. However, more important is the fact that the element 12, comprising the lowermost point of the helix 20, that is, that portion of the lower fastening element which would be the first to tend to pull through the sheet on drawing up of the bolt, cannot possibly give way since it is integral with the sheet as at 30 and thereby provided with the maximum strength possible at its most vulnerable point.

Figs. 24-28 inclusive show the method of the instant invention as developed in a further embodiment in which still greater strength may be obtained in the fastening means provided. The method as followed in this embodiment incorporates the steps and teachings as outlined above with reference to the embodiments disclosed in Figs. 1 to 14 inclusive and Figs. 15 to 23 inclusive; and in this respect the specific fastening means of either of said embodiments may be included in the completed fastening means provided in this form of the invention. Generally speaking, this embodiment of the method contemplates a fastening means comprising a plurality of distinct, independently movable fastening elements so designed as to engage more than one thread of the threaded member thereby providing for greater strength in an installation. Thus, as shown in Fig. 24 in which the embodiment of the method shown in Figs. 15 to 23 inclusive for basic elements 11, 12, is included, an additional fastening element 40, is provided from the plane of the sheet S'', as by a slitting and punching operation along lines 41 with the extremity 42 of such element being defined by a perforation 43. This auxiliary fastening element, thus provided, is bent by a suitable forming operation out of the plane of the sheet in a return bend 44 substantially as indicated by dotted lines, Fig. 24 with the extremity 42 thereof so disposed as to lie in registration with the extremity of fastening element 12 substantially as illustrated in Figs. 25 and 26. As shown in Fig. 27, the said fastening element 40 may be corrugated throughout its length for increased strength with the extremity 42 thereof suitably shaped to lie on a helix corresponding to that of the threads of the threaded member. Thus, as shown in Fig. 28, the basic fastening elements 11, 12 are provided to operate in the usual manner as described above, engaging one thread of the threaded member 10 throughout, and the element 40 acts in conjunction therewith engaging the next adjacent thread thereby providing greater strength in the fastening means not only from the standpoint that more than one thread of the threaded member is effectively engaged, but also, by reason of the fact that the basic fastening elements 11, 12 are relieved of a proportionate degree of strain when the threaded member is drawn up to tightened, locked fastening engagement.

Fig. 29 shows an alternate construction of this embodiment of the invention wherein each of the fastening elements 11a, 12a, and 40a engage distinct threads of the threaded member thereby providing for even greater strength and locking action. Thus the lowermost thread 12a, preferably integral in the plane of the sheet S" as illustrated in the embodiment of Fig. 23, engages the lowermost effective thread of the bolt, the oppositely disposed cooperating element 11a engages the next adjacent thread, and the auxiliary element 40a engages the next or third thread such that the strain set up in the fastening elements as the bolt is drawn up is evenly distributed and the binding action of the extremities thereof takes place at spaced points throughout the length of the threaded member.

While the method of this invention has been described in detail with specific examples, such examples are illustrative only, since it will be apparent to those skilled in the art that other embodiments within the spirit and scope of the invention may be practiced without departing from the teachings or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. The method of working sheet metal to provide fastening means adapted to receive a threaded fastening, which comprises, slitting and punching an area of the sheet to define an element for threadedly engaging said threaded fastening, and forming said element of the fastening means into a substantial longitudinal corrugation extending substantially throughout the width thereof thereby providing for increased strength therein.

2. The method of working sheet metal for providing means adapted to receive a threaded member, which comprises, slitting and punching an area of the sheet to define an element having an irregular shaped extremity, and deforming said element longitudinally into a substantial corrugation extending substantially its full width thereby providing for increased strength therein and shaping the extremity thereof to correspond substantially to the cross-section of the threaded member.

3. The method of working sheet metal for providing means adapted to receive a threaded member, which comprises, slitting and punching an area of the sheet to define an element having an irregular shaped extremity, and deforming said element longitudinally into a substantial corrugation extending substantially its full width thereby providing for increased strength therein and shaping the extremity thereof to correspond substantially to the cross-section of the threaded member, and truing said extremity to lie on a helix corresponding to that of the threads of the threaded member for uniform threaded engagement therewith throughout.

4. The method of working sheet metal for providing means adapted to receive a threaded member, which comprises, slitting and punching an area of the sheet to define distinct, independently movable elements adapted to coact in engaging a threaded member applied thereto, and forming at least one of said elements into a substantial longitudinal corrugation extending substantially throughout the width thereof thereby providing for increased strength therein.

5. The method of working sheet metal for providing means adapted to receive a threaded member, which comprises, slitting and punching an area of the sheet to define distinct, independently movable elements adapted to coact in engaging a threaded member applied thereto, and forming at least one of said elements into a substantial longitudinal corrugation extending substantially throughout the width thereof thereby providing for increased strength therein and shaping the extremity thereof to correspond substantially to the cross-section of the threaded member.

6. The method of working sheet metal for providing means adapted to receive a threaded member, which comprises, slitting and punching an area of a sheet to define distinct, independently movable elements adapted to coact in engaging a threaded member applied thereto, and forming at least one of said elements into a substantial longitudinal corrugation extending substantially throughout the width thereof thereby providing for increased strength therein and shaping the extremity thereof to correspond substantially to the cross-section of the threaded member, and truing said extremity to lie on a helix corresponding to that of the threads of the threaded member for uniform, threaded engagement therewith throughout.

7. The method of working sheet metal for providing means adapted to receive a threaded member, which comprises, slitting an area of the sheet to define distinct independently movable elements, punching the elements so defined to provide at least one with an irregular shaped extremity, forming said element longitudinally into a substantial corrugation extending substantially throughout the width thereof thereby providing for increased strength therein and shaping the extremity thereof to correspond substantially to the cross-section of the threaded member.

8. The method of working sheet metal for providing means adapted to receive a threaded member, which comprises, slitting an area of the sheet to define distinct independently movable elements, punching the elements so defined to provide at least one with an irregular shaped extremity, forming said element longitudinally into a substantial corrugation extending substantially throughout the width thereof thereby providing for increased strength therein and shaping the extremity thereof to correspond substantially to the cross-section of the threaded member, and truing said extremity to lie on a helix corresponding to that of the threads of the threaded member for uniform threaded engagement therewith throughout.

9. The method of working sheet metal for providing means adapted to receive a threaded member, which comprises, slitting and punching an area of the sheet to define a plurality of distinct, independently movable elements having irregular shaped extremities, deforming the elements so defined into corrugations extending substantially the full width thereof to provide increased strength therein and an opening therebetween corresponding substantially to the cross-sectional area of the threaded member.

10. The method of working sheet metal for providing means adapted to receive a threaded member, which comprises, slitting and punching an area of the sheet to define a plurality of distinct, independently movable elements having irregular shaped extremities, deforming the elements so defined into corrugations extending substantially the full width thereof to provide for increased strength therein and an opening therebetween corresponding substantially to the cross-sectional area of the threaded member, and shaping the extremities thereof for uniform threaded engagement with the threads of the threaded member throughout.

11. The method of working sheet metal for providing means adapted to receive a threaded member, which comprises, slitting and punching an area of the sheet to define a plurality of distinct, independently movable elements having irregular shaped extremities, deforming the elements so defined into corrugations extending substantially the full width thereof to provide for increased strength therein and an opening therebetween corresponding substantially to the cross-sectional area of the threaded member, and truing said extremities to lie on a helix corresponding to that of the threads of the threaded member for uniform threaded engagement therewith throughout.

12. The method of working sheet metal for providing means adapted to receive a threaded member which comprises, slitting an area of the sheet to define distinct, independently movable elements, punching the elements to provide the same with irregular shaped extremities, deforming the elements into corrugations extending substantially the full width thereof to provide for increased strength therein and to project materially out of the plane of the sheet and to shape said irregular shaped extremities to correspond substantially to the cross-sectional area of the threaded member.

13. The method of working sheet metal for providing means adapted to receive a threaded member which comprises, slitting an area of the sheet to define distinct, independently movable elements, punching the elements to provide the same with irregular-shaped extremities, deforming the elements longitudinally into substantial corrugations extending substantially throughout the width thereof and projecting materially out of the plane of the sheet thereby providing for increased strength therein and shaping said irregular-shaped extremities to present an opening therebetween corresponding substantially to the cross-sectional area of the threaded member, and truing said extremities to lie on a helix corresponding to that of the threads of the threaded member for uniform threaded engagement therewith throughout.

14. The method of working sheet metal for providing means adapted to receive a threaded member which comprises, slitting an area of the sheet to define distinct, independently movable elements, punching the elements to provide the extremities thereof with a substantial oval-shaped opening therebetween, deforming the elements into longitudinal corrugations extending substantially the full width thereof and projecting materially out of the plane of the sheet thereby providing for increased strength therein and shaping said oval-shaped opening to substantially truly circular to correspond to the cross-sectional area of the threaded member, and truing said extremities to lie on a helix corresponding to the threads of the threaded member for uniform threaded engagement therewith throughout.

GEORGE A. TINNERMAN.